US012707540B2

(12) United States Patent
Aoki

(10) Patent No.: US 12,707,540 B2
(45) Date of Patent: Aug. 11, 2026

(54) LIGHT-EMITTING ELEMENT DRIVE DEVICE, LIGHT EMISSION CONTROL DEVICE, AND LIGHT EMISSION DEVICE

(71) Applicant: ROHM CO., LTD., Kyoto (JP)

(72) Inventor: Akira Aoki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 141 days.

(21) Appl. No.: 18/895,569

(22) Filed: Sep. 25, 2024

(65) Prior Publication Data

US 2025/0024568 A1 Jan. 16, 2025

Related U.S. Application Data

(63) Continuation of application No. PCT/JP2023/005649, filed on Feb. 17, 2023.

(30) Foreign Application Priority Data

Mar. 31, 2022 (JP) ................................ 2022-060370

(51) Int. Cl.
*H05B 45/14* (2020.01)

(52) U.S. Cl.
CPC .................................. *H05B 45/14* (2020.01)

(58) Field of Classification Search
None
See application file for complete search history.

(56) References Cited

U.S. PATENT DOCUMENTS 9,504,110 B2 * 11/2016 Kim ...................... H05B 45/44
9,609,702 B2 * 3/2017 Kim ...................... H05B 45/44
9,763,305 B1 * 9/2017 Pamato .................. H05B 45/56
9,769,888 B2 * 9/2017 Wang ...................... H05B 45/14
9,992,826 B1 * 6/2018 Safaee ................... H05B 45/38
10,212,770 B2 * 2/2019 Guo ........................ H02M 7/06
10,368,406 B2 * 7/2019 Cohen ..................... H02M 1/08
10,407,113 B2 * 9/2019 Chiu ...................... B62D 55/14
10,560,990 B1 * 2/2020 Fragiacomo ........... H05B 45/37
10,757,775 B2 * 8/2020 Modepalli .............. H05B 45/24

(Continued)

FOREIGN PATENT DOCUMENTS

JP 2021-044283 3/2021

OTHER PUBLICATIONS

International Search Report and Written Opinion in International Appln. No. PCT/JP2023/005649, mailed on May 9, 2023, 13 pages (with machine translation).

*Primary Examiner* — Srinivas Sathiraju

(74) *Attorney, Agent, or Firm* — Fish & Richardson P.C.

(57) ABSTRACT

A light-emitting element drive device includes, for example, a current sense amplifier configured to generate a current detection signal corresponding to a difference between a sense voltage corresponding to an inductor current (and thus an output current) supplied to a light-emitting element and a predetermined current setting signal (e.g., an offset voltage corresponding to a set current), an error amplifier configured to generate an error signal such that a direct-current component of the current detection signal has a zero value, a comparator configured to generate a set signal by comparing the current detection signal with the error signal, and a driver configured to perform feedback control of the output current in accordance with the set signal.

10 Claims, 17 Drawing Sheets

(56) References Cited

U.S. PATENT DOCUMENTS

| | | | | |
|---|---|---|---|---|
| 10,959,306 | B2 * | 3/2021 | Song | H03G 1/0005 |
| 11,172,556 | B2 * | 11/2021 | Aoki | H05B 45/14 |
| 11,272,591 | B1 * | 3/2022 | Lee | H02H 3/087 |
| 11,445,587 | B2 * | 9/2022 | Greenwood | H05B 45/46 |
| 12,452,975 | B2 * | 10/2025 | Ni | H05B 45/46 |
| 2009/0322234 | A1 * | 12/2009 | Chen | H05B 45/38 315/159 |
| 2015/0257230 | A1 * | 9/2015 | Lee | H05B 47/19 315/186 |
| 2015/0271884 | A1 * | 9/2015 | Kim | H05B 45/48 315/153 |
| 2016/0007416 | A1 * | 1/2016 | Viviani | H05B 45/48 315/200 R |
| 2016/0014858 | A1 * | 1/2016 | Ramabhadran | H05B 45/382 315/186 |
| 2016/0095174 | A1 * | 3/2016 | Vaughan | H05B 45/37 315/291 |
| 2016/0150607 | A1 * | 5/2016 | Kim | H05B 45/3575 315/210 |
| 2016/0255691 | A1 * | 9/2016 | Yu | H05B 45/46 315/193 |
| 2016/0262227 | A1 * | 9/2016 | Mednik | H05B 45/3725 |
| 2016/0366733 | A1 * | 12/2016 | Wang | H05B 45/3725 |
| 2017/0142797 | A1 * | 5/2017 | Chiu | H05B 45/31 |
| 2017/0142798 | A1 * | 5/2017 | Chiu | H05B 45/48 |
| 2017/0164435 | A1 * | 6/2017 | Lee | H05B 45/48 |
| 2017/0181236 | A1 * | 6/2017 | Lee | H05B 45/3725 |
| 2017/0223800 | A1 * | 8/2017 | Wu | H05B 45/14 |
| 2017/0354003 | A1 * | 12/2017 | Lee | H05B 45/3725 |
| 2017/0354004 | A1 * | 12/2017 | Park | H05B 45/3725 |
| 2018/0007753 | A1 * | 1/2018 | Kuang | H05B 45/10 |
| 2018/0007754 | A1 * | 1/2018 | Kuang | H05B 45/10 |
| 2018/0014369 | A1 * | 1/2018 | Kim | H05B 45/395 |
| 2018/0092179 | A1 * | 3/2018 | Guo | H02M 1/14 |
| 2018/0132313 | A1 * | 5/2018 | Kuang | H05B 45/3725 |
| 2018/0220502 | A1 * | 8/2018 | Morales | H05B 45/48 |
| 2020/0383188 | A1 * | 12/2020 | Aoki | H05B 45/345 |
| 2021/0059028 | A1 * | 2/2021 | Greenwood | H05B 45/10 |
| 2023/0397311 | A1 * | 12/2023 | Ni | H05B 45/395 |
| 2025/0024568 | A1 * | 1/2025 | Aoki | H05B 45/54 |

* cited by examiner

LIGHT-EMITTING ELEMENT DRIVE DEVICE, LIGHT EMISSION CONTROL DEVICE, AND LIGHT EMISSION DEVICE

CROSS-REFERENCE TO RELATED APPLICATIONS

This nonprovisional application is a continuation application of International Patent Application No. PCT/JP2023/005649 filed on Feb. 17, 2023, which claims priority to Japanese Patent Application No. 2022-060370 filed on Mar. 31, 2022, the entire contents of which are hereby incorporated by reference.

TECHNICAL FIELD

The disclosure herein relates to a light-emitting element drive device, and a light emission control device and a light emission device that use the same.

BACKGROUND ART

Conventionally, there have been proposed various types of light-emitting element drive devices that supply a steady output current to a light-emitting element.

An example of conventional technologies related to the above is disclosed in Patent Document 1 identified below.

CITATION LIST

Patent Literature

Patent Document 1: JP-A-2021-044283

DESCRIPTION OF EMBODIMENTS

<Lighting Restoration Operation when LED (Light Emitting Diode] is Open>

Figure 1:
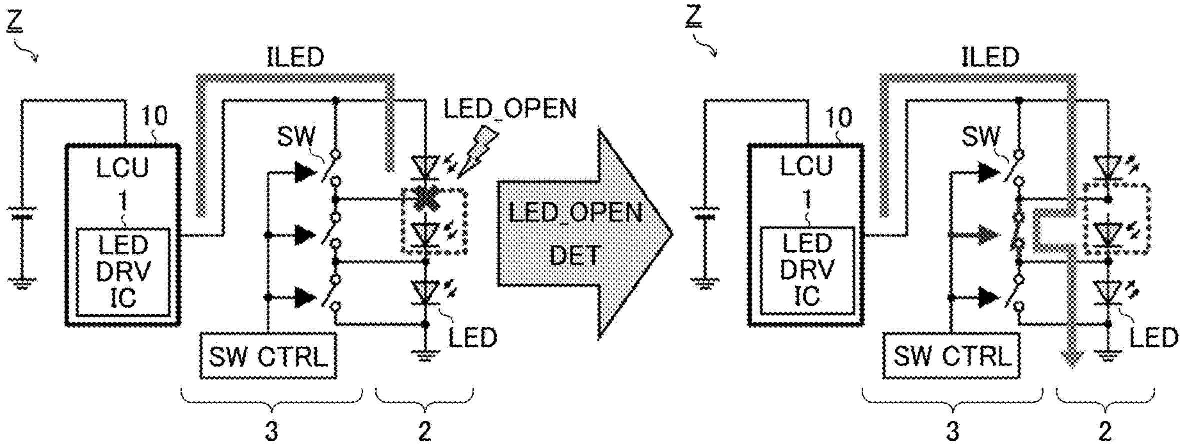
FIG. 1 is a diagram illustrating a lighting restoration operation (continuous operation) when an LED is open.

FIG. 1 is a diagram illustrating a lighting restoration operation (continuous operation) when an LED is open. An LED lamp module Z illustrated in the present figure is an example of a light emission device provided as a head lamp, a tail lamp, or a turn lamp of a vehicle, for example, and it includes an LCU (light control unit) 10 (=equivalent to a light emission control device), an LED string 2 (=equivalent to a light-emitting element), and a matrix manager 3 (=equivalent to a switch control device).

The LCU 10 includes an LED driver IC 1 (=equivalent to a light-emitting element drive device), and supplies an output current ILED to the LED string 2.

The LED string 2 includes a plurality of serially-connected LED elements, and emits light with a brightness corresponding to the output current ILED.

The matrix manager 3 includes a plurality of switch elements SW that are connected in parallel to each of the plurality of LED elements which form the LED string 2, and switches the number of serial stages (the number of lit LED elements) as necessary by turning on/off each of the switch elements.

Now, as is clear from comparison between the left and right parts of the present figure, the LED lamp module Z, which includes the matrix manager 3, is capable of staying lit even when an open fault occurs in the LED string 2.

Specifically, in the LED lamp module Z illustrated in the present figure, by forcibly turning on the switch element SW that is parallelly connected to an LED element where the open fault has occurred, a path can be secured for the output current ILED to flow through bypassing the open-fault point in the LED string 2, and thereby the LED string 2 can be restored to its lit state.

Other environments that can cause a load open fault are, for example, poor connection of a connector due to vibration during vehicle traveling, disconnection of an output wire harness, extraction and insertion of a connector during a maintenance operation, etc.

Figure 2:
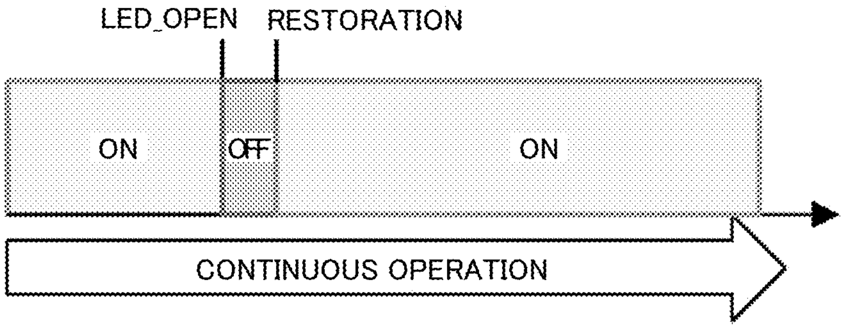
FIG. 2 is a diagram illustrating an example of an operation mode required in restoring lighting.

FIG. 2 is a diagram illustrating an example of an operation mode required to restore lighting from an LED open fault. As illustrated in the present figure, the LCU 10 (in particular the LED driver IC 1 constituting its main portion) is required to continue its operation even when an LED open fault occurs, quickly raise the output current ILED to a current setting value (target value) after establishing a path bypassing the open-fault point, and restore the LED string 2 to its lit-state at high speed.

Figure 3:
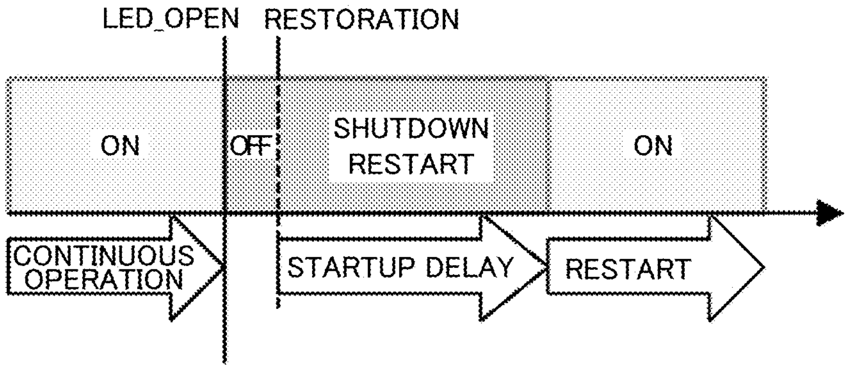
FIG. 3 is a diagram illustrating an example of an operation mode typical in restoring lighting.

FIG. 3 is a diagram illustrating an example of an operation mode typical in restoring lighting from an LED open fault. As illustrated in the present figure, in the operation mode typical in lighting restoration, the LCU 10 is temporarily shut down when an LED open fault is detected, and is then restarted. Consequently, due to a startup delay of the LCU 10, it takes some time to restore the lighting of the LED string 2.

Hereinafter, the reason why it has been considered necessary to restart the LCU 10 to restore lighting from an LED open fault will be described while exemplifying a typical circuit configuration of the LCU 10.

First Embodiment (Comparative Example)

Figure 4:
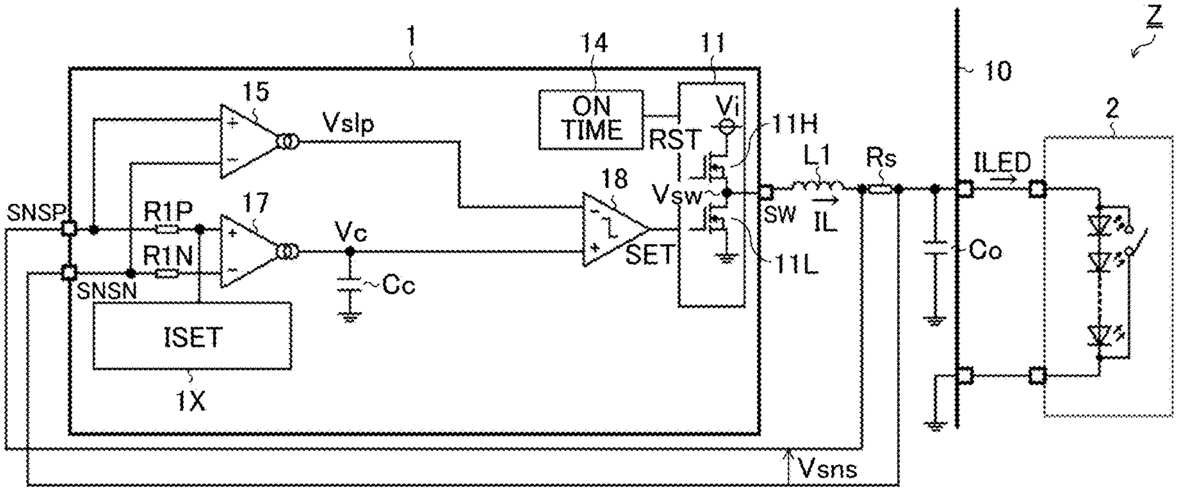
FIG. 4 is a diagram illustrating an LED lamp module of a first embodiment.

FIG. 4 is a diagram illustrating a first embodiment of the LED lamp module Z (=a typical circuit configuration to be compared with a second embodiment which will be described later). As described previously, the LED lamp module Z of the present embodiment includes the LCU 10 and the LED string 2. Of the aforementioned matrix manager 3, illustration is omitted for the sake of convenience.

The LCU 10 includes the LED driver IC 1 and various discrete components (in the figure, an inductor L1, a sense resistor Rs, and a capacitor Co) externally attached to the LED driver IC 1.

The LED driver IC 1 is a semiconductor integrated circuit device that steps down an input voltage Vi of a power system and performs power supply to the LED string 2 (=generation of the output current ILED). The LED driver IC 1 includes a plurality of external terminals (an SW pin, an SNSP pin, an SNSN pin, etc.) as means for establishing external electrical connection to outside the IC. The SW pin is a switch output terminal. The SNSP pin is a first current sense terminal (+). The SNSN pin is a second current sense terminal (−).

The SW pin is connected to a first end of the inductor L1. A second end of the inductor L1 is connected to a first end of the sense resistor Rs. A second end of the sense resistor Rs and a first end of the capacitor Co are both connected to an anode of the LED string 2. A cathode of the LED string 2 and a second end of the capacitor Co are both connected to a ground end. A first end (high-potential end) of the sense resistor Rs is connected to the SNSP pin. A second end (low-potential end) of the sense resistor Rs is connected to the SNSN pin.

Among the above-described discrete components, the inductor L1 and the capacitor Co, together with a driver 11 (in particular, a high-side switch 11H and a low-side switch 11L included in the driver 11) integrated in the LED driver IC 1, form a step-down type switch output stage.

Further, the sense resistor Rs converts an inductor current IL flowing through the inductor L1 into a sense voltage Vsns.

The LED driver IC 1 includes, integrated therein, the driver 11, an on-time setting unit 14, a slope signal generator 15, an error amplifier 17, a comparator 18, a current setting unit 1X, input resistors R1P and R1N, and a capacitor Cc. Needless to say, the LED driver IC 1 may also include other components (such as a temperature detection circuit, various protection circuits, etc.) integrated therein in addition to those described above.

The driver 11 includes the high-side switch 11H and the low-side switch 11L. The high-side switch 11H is connected between a PIN pin (=an application end of the input voltage Vi) and the SW pin. On the other hand, the low-side switch 11L is connected between the SW pin and a PGND pin. As each of the high-side switch 11H and the low-side switch 11L, an NMOSFET (N-channel type metal oxide semiconductor field effect transistor) can be suitably used.

The high-side switch 11H and the low-side switch 11L, which are connected in the above-described manner, form half-bridge type (synchronous rectification-type) switch output stage that outputs a switch voltage Vsw, which has a rectangular wave shape, from the SW pin. That is, the high-side switch 11H is equivalent to an output element, and the low-side switch 11L is equivalent to a synchronous rectifier element. Note that, in a case of adopting a diode rectification-type switch output stage, a rectifier diode can be used instead of the low-side switch 11L.

The driver 11 complementarily turns on/off the high-side switch 11H and the low-side switch 11L in accordance with a set signal SET and a reset signal RST, and thereby performs feedback control of the inductor current IL (and thus the output current ILED) using a bottom detection fixed on-time method such that the output current ILED becomes equal to a predetermined current setting value (target value).

More specifically, the driver 11 turns on the high-side switch 11H and turns off the low-side switch 11L at a rising timing of the set signal SET, and on the other hand, turns off the high-side switch 11H and turns on the low-side switch 11L at a rising timing of the reset signal RST.

Note that the term "complementarily" herein should be understood broadly to cover not only operation where the on/off states of the high-side and low-side switches 11H and 11L are completely reversed, but also operation where a simultaneously-off period (so-called dead time) for preventing a through current is provided.

Thus, if a nonlinear control method (e.g., a bottom detection fixed on-time method) is adopted as an output feedback control method for the LED driver IC 1, the operation of the matrix manager 3 enables continuation of stable and constant supply of the output current ILED even if the number of serial stages of the LED elements (the number of lit LED elements) varies.

The on-time setting unit 14 generates a pulse in the reset signal RST when a predetermined on-time Ton passes after a pulse is generated in the set signal SET. In other words, the on-time setting unit 14 raises the reset signal RST to high level when the predetermined on-time Ton passes after a rising timing of the set signal SET (and thus after an on timing of the high-side switch 11H). The on-time setting unit 14 may have a function of setting the on-time Ton as necessary. The on-time setting unit 14 may also have a function of varying the on-time Ton so as to suppress variation of a switching frequency Fsw based on respective terminal voltages of the PIN pin and the SNSN pin.

The slope signal generator 15 generates a slope signal Vslp, which includes information (an alternate-current component) of the inductor current IL, from the sense voltage Vsns applied between a non-inverting input terminal (+) and an inverting input terminal (−) thereof. The slope signal Vslp becomes higher as the inductor current IL becomes larger, and becomes lower as the inductor current IL becomes smaller.

A non-inverting input end (+) of the error amplifier 17 is connected via the input resistor R1P to the SNSP pin. The inverting input end (−) of the error amplifier 17 is connected via the input resistor R1N to the SNSN pin. Between an output end of the error amplifier 17 and the ground end, the capacitor Cc is connected. Connected in this manner, the error amplifier 17 outputs a current corresponding to a terminal-to-terminal voltage between the SNSP pin and the SNSN pin (=the sense voltage Vsns generated across the sense resistor Rs), and generates an error signal Vc by charging and discharging the capacitor Cc.

The comparator 18 compares the slope signal Vslp fed to the inverting input end (−) thereof with the error signal Vc fed to the non-inverting input end (+) thereof, and thereby generates the set signal SET. The set signal SET is at low level when Vc<Vslp, and is at high level when Vc>Vslp. Accordingly, the lower the error signal Vc is, the later the timing is at which the set signal SET rises (thus the timing at which the high-side switch 11H turns on), and the higher the error signal Vc is, the earlier the timing is at which the set signal SET rises.

The current setting unit 1X passes a reference current through the input resistor R1P or R1N, and thereby sets an input offset value of the error amplifier 17 (and thus the current setting value of the output current ILED).

Figure 5:
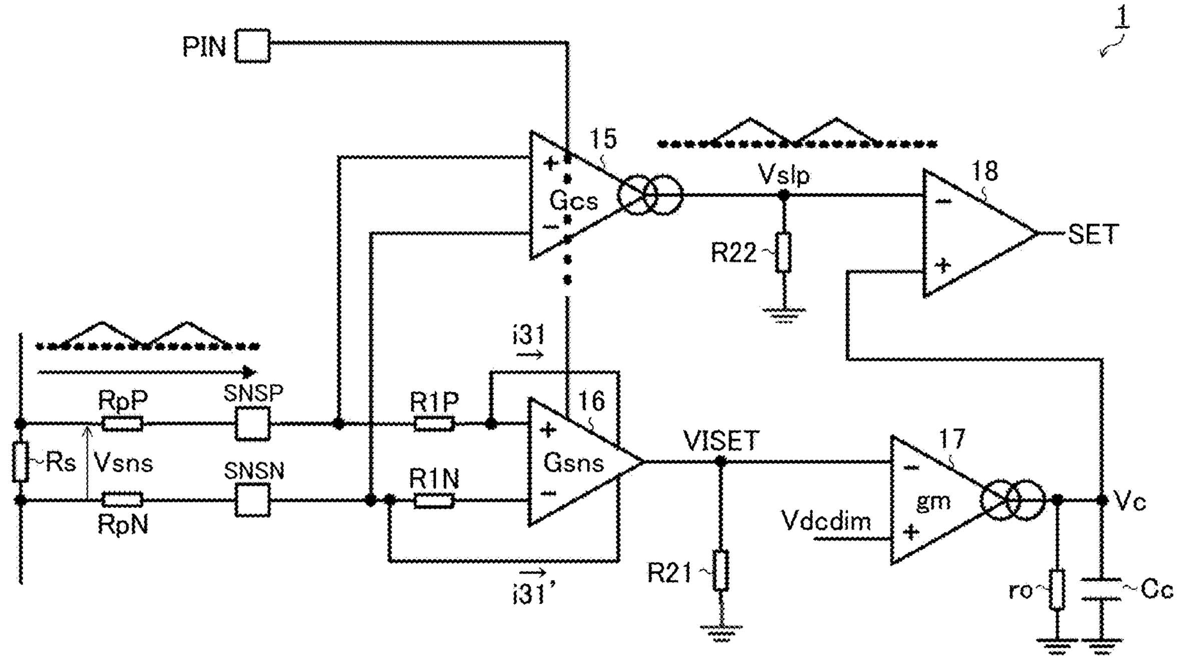
FIG. 5 is a diagram illustrating an example of a circuit configuration in the first embodiment.

FIG. 5 is a diagram illustrating an example of a specific circuit configuration in the LED driver IC 1 of the first embodiment. In the present figure, the components already described above are denoted by the same symbols as in FIG. 4 and overlapping descriptions thereof are omitted, and the following description will focus on new components and modifications.

The LED driver IC 1 of the present configuration example includes integrated therein, in addition to the slope signal generator 15, the error amplifier 17, the comparator 18, the input resistors R1P and R1N, and the capacitor Cc, of which all have been described above, a current sense amplifier 16 and resistors R21, R22, and Ro.

Further, in the LED driver IC 1 of the present configuration example, current limiting resistors RpP and RpN are connected respectively between the first end (high-potential end) of the sense resistor Rs and the SNSP pin, and between the second end (low-potential end) of the sense resistor Rs and the SNSN pin.

The error amplifier 17 outputs a current corresponding to a difference between an analog light dimming signal Vdcdim (=equivalent to a predetermined current setting signal) fed to a non-inverting input end (+) thereof and a current detection signal VISET fed to an inverting end (−) thereof, and generates the error signal Vc by charging and discharging the capacitor Cc. Accordingly, the error signal Vc rises when VISET<Vdcdim, and falls when VISET>Vdcdim. Between an output end of the error amplifier 17 and the ground end, the resistor ro is connected in parallel with the capacitor Cc. The capacitor Cc is provided for phase compensation. Further, the resistor ro is an output impedance of the error amplifier 17, and does not exist as a real element.

The slope signal generator 15 is a gm amplifier that operates by receiving a current supply from the PIN pin and that is capable of detecting the sense voltage Vsns appearing between the SNSP pin and the SNSN pin without drawing a current therefrom. Between the slope signal generator 15 and the ground end, the resistor R22 is connected.

The current sense amplifier 16 operates by receiving a power supply from the PIN pin, and amplifies the sense voltage Vsns to thereby generate the current detection signal VISET. A non-inverting input end (+) of the current sense amplifier 16 is connected via the input resistor R1P to the SNSP pin. An inverting input end (−) of the current sense amplifier 16 is connected via the input resistor R1N to the SNSN pin. An output end of the current sense amplifier 16 (=an application end of the current detection signal VISET) is connected to a first end of the resistor R21 and is also connected to the inverting input end (−) of the error amplifier 17. A second end of the resistor R21 is connected to the ground end.

Further, the current sense amplifier 16 includes a first feedback current path configured to pass a first feedback current i31 between the output end and the non-inverting input end (+) thereof, and a second feedback current path configured to pass a second feedback current i31' between the output end thereof and the SNSN pin. The second feedback current i31' may be a copy (mirror current) of the first feedback current i31, or may be a current generated by giving an offset to the copy of the first feedback current i31.

With this configuration, even with the current limiting resistors RpP and RpN externally connected to the SNSP pin and the SNSN pin, respectively, it is possible to reduce a differential input current difference of the current sense amplifier 16 (and thus a gain error of the current sense amplifier 16). This helps mitigate accuracy degradation (in particular, temperature drift) in current detection in the LED driver IC 1.

Further, the external connection of the current limiting resistors RpP and RpN helps protect electrostatic protection diodes (unillustrated), which are respectively incorporated in the SNSP pin and the SNSN pin, from a surge current. This eliminates the need for an externally connected surge protection diode, making it possible to reduce cost of the LED lamp module Z and an area on a substrate for mounting components.

Note that, however, the LED driver IC 1 of the present configuration example requires two floating amplifiers (the slope signal generator 15 and the current sense amplifier 16) capable of performing rail-to-rail amplification of the sense voltage Vsns (between a power supply potential and a ground potential). This leads to an increased circuit area, which should be taken into account. The term “floating” herein means floating from the ground potential (being separated in terms of potential).

Figure 6:
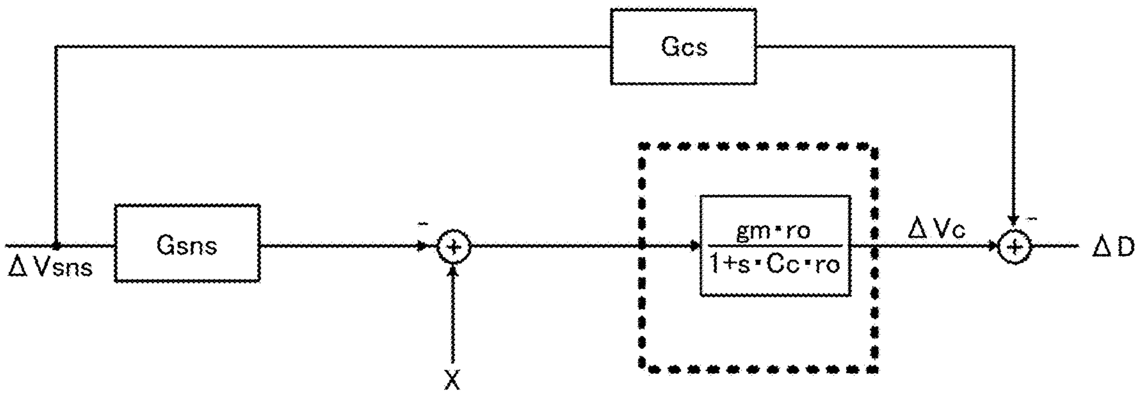
FIG. 6 is a diagram illustrating an example of signal transmission in the first embodiment.

FIG. 6 is a diagram illustrating an example of signal transmission in the LED driver IC 1 of the first embodiment (=a revision of the previously referenced FIG. 5 as a block diagram). Symbol Gcs denotes a gain of the slope signal generator 15. Symbol Gsns denotes a gain of the current sense amplifier 16. Symbol gm denotes a transconductance of the error amplifier 17 (=a conversion value from an amplifier input voltage to an amplifier output current). Symbol ΔVsns denotes the sense voltage Vsns. Symbol X denotes a current setting value (target value) of the output current ILED. Symbol ΔVc denotes the error signal Vc. AD denotes an off-duty ratio of the low-side switch 11L (control of a bottom value of the inductor current IL−off-period control). Symbol ro denotes a resistance value of the resistor ro (=an output impedance of the error amplifier 17). Symbol Cc denotes capacitance of the capacitor Cc. Symbol s denotes a complex number s (=jω).

As is clear from the present figure, the LED driver IC 1 of the first embodiment has a signal transmission system having a first-order characteristic with the inductor current IL (=an average inductor current IL_ave+a current ripple component ΔIL) is a control point.

Figure 7:
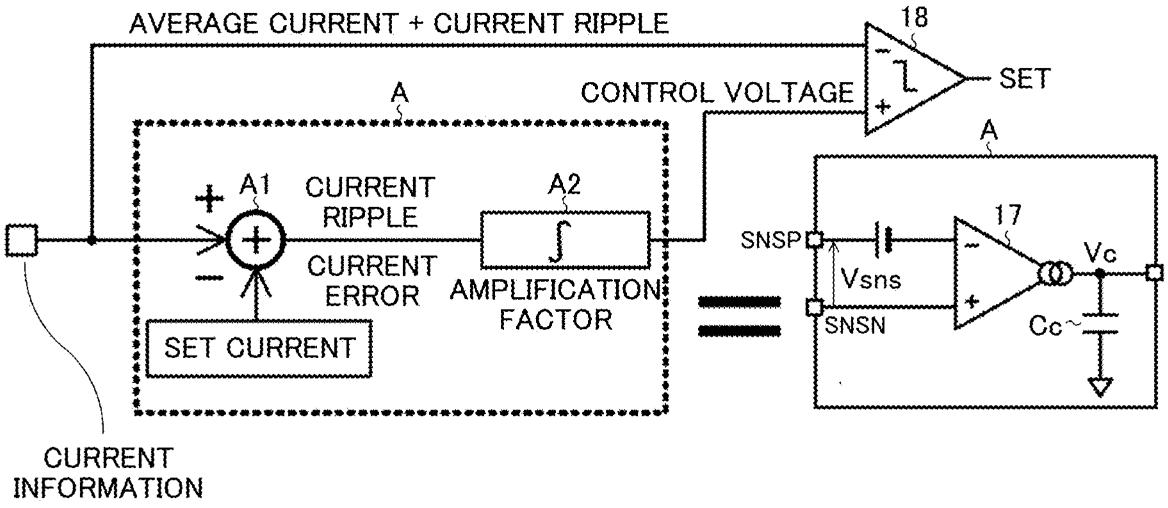
FIG. 7 is a diagram illustrating an example of a control block in the first embodiment.

FIG. 7 is a diagram illustrating an example of a control block in the LED driver IC 1 of the first embodiment. A control block A of the present figure is a function-based revised illustration of the error amplifier 17 of FIG. 4, and includes a subtractor A1 and an amplifier A2.

The subtractor A1 subtracts a set current ISET from current information of the inductor current IL (=the average inductor current IL_ave+the current ripple component ΔIL) and thereby generates a current error signal. When the output current ILED is in an equilibrium state, the average inductor current IL_ave is equal to the set current ISET. Thus, the current error signal output from the subtractor A1 is equivalent to the current ripple component ΔIL of the inductor current IL.

The amplifier A2 amplifies the current error signal (=the current ripple component ΔIL) output from the subtractor A1 by integration, and thereby generates a control voltage.

The comparator 18 compares the current information of the inductor current IL (=the slope signal Vslp) with the control voltage (=the error signal Vc).

Figure 8:
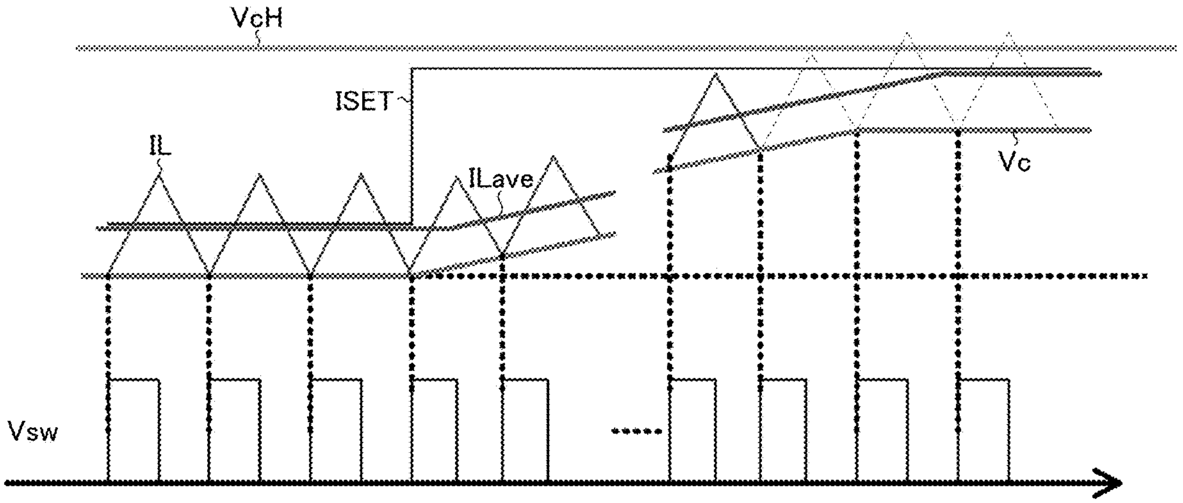
FIG. 8 is a diagram illustrating how an error signal depends on a set current in the first embodiment.

FIG. 8 is a diagram illustrating how the error signal Vc in the LED driver IC 1 of the first embodiment depends on the set current ISET.

In the LED driver IC 1 of the first embodiment, control is performed by comparison between the bottom value of the inductor current IL (more precisely, a bottom value of the slope signal Vslp equivalent to the current information of the inductor current IL) and the error signal Vc such that a difference between the inductor current IL (more precisely, the average inductor current IL_ave) and the set current ISET becomes 0.

Here, if the set current ISET is raised, the error signal Vc rises following the set current ISET, due to which the bottom value of the inductor current IL also rises. As a result, the average inductor current IL_ave converges to the raised set current ISET.

In this manner, in the LED driver IC 1 of the first embodiment, the error signal Vc has dependence on the set current ISET. Consequently, an upper limit value VcH of the error signal Vc (=an upper limit clamp value in the event of an LED open fault) must be set to a value higher than a maximum value of the error signal Vc (=the error signal Vc when the set current ISET is set to a maximum value).

Figure 9:
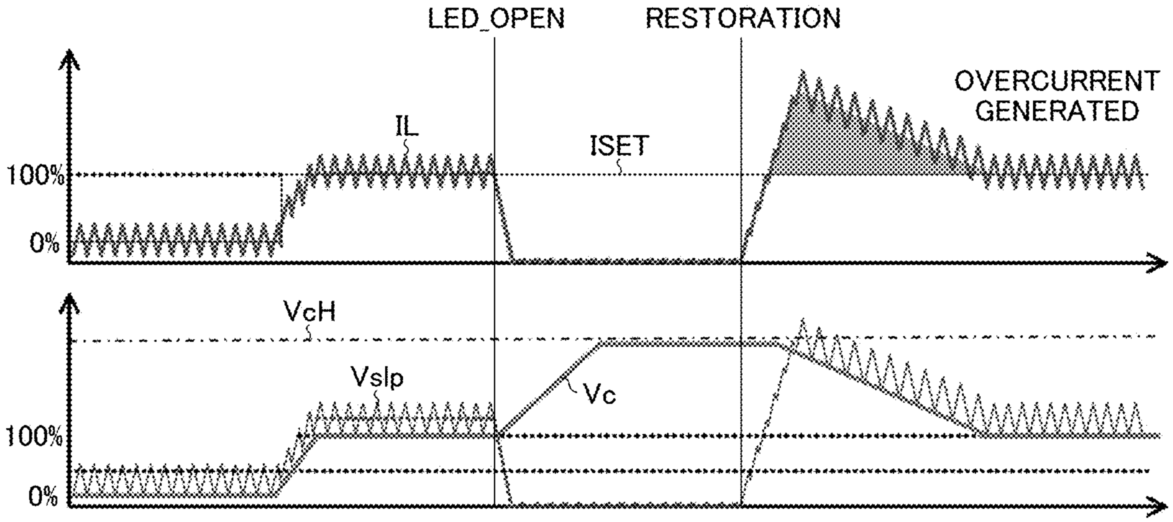
FIG. 9 is a diagram illustrating an example of a lighting restoration operation in the first embodiment.

FIG. 9 is a diagram illustrating an example of a lighting restoration operation in the LED driver IC 1 of the first embodiment. The upper diagram of the present figure illustrates a behavior of the inductor current IL. The lower diagram of the present figure illustrates behaviors of the slope signal Vslp and the error signal Vc.

When an open fault occurs in the LED string 2, a state is brought about where the inductor current IL stops flowing and the sense voltage Vsns is not generated (a state where the output feedback control is rendered ineffective). If the LED driver IC 1 is continuously operated in this state, the slope signal Vslp falls to low level (GND level), and the error signal Vc rises to the upper limit value VcH (out of a normal-operation control range).

Thereafter, when the open-fault point in the LED string 2 is bypassed by the previously-described matrix manager 3 (see FIG. 1), for example, the inductor current IL starts to flow again, and the LED string 2 is restored to its lit state.

However, when lighting is restored from the LED open fault, the error signal Vc still stays at the upper limit value VcH, which is higher than a normal operating point (=a signal level corresponding to the set current ISET). Thus, until the error signal Vc returns from the upper limit value VcH to the normal operating point, an excessive inductor current IL (so-called overcurrent) is generated.

As a countermeasure to prevent the generation of such an overcurrent, it is conceivable to temporarily shut down the LED driver IC 1 on detection of an LED open fault, and then restart it (see the previously referenced FIG. 3). However, with such a countermeasure, due to the delayed startup of the LED driver IC 1, it takes some time to restore the lighting of the LED string 2. This makes it difficult to satisfy the market demand for immediate lighting restoration of the LED string 2.

Figure 10:
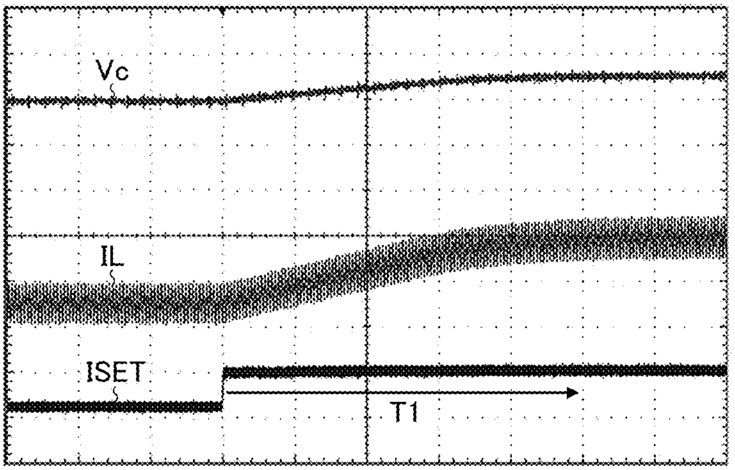
FIG. 10 is a diagram illustrating an example of response of an output current in the first embodiment.

FIG. 10 is a diagram illustrating response of the output current ILED in the LED driver IC 1 of the first embodiment, where the error signal Vc, the inductor current IL, and the set current ISET are depicted in order from the top.

As mentioned previously, in the LED driver IC 1 of the first embodiment, the error signal Vc has dependence on the set current ISET. According to the present figure, as the set current ISET is raised, the error signal Vc rises first, and following this, the inductor current IL converges to the target value. As for a time T1 taken for the inductor current IL to converge to the target value, it is about several hundred s.

Thus, in the LED driver IC 1 of the first embodiment, the inductor current IL (and thus the output current ILED) shows poor response to the set current ISET.

Second Embodiment

Figure 11:
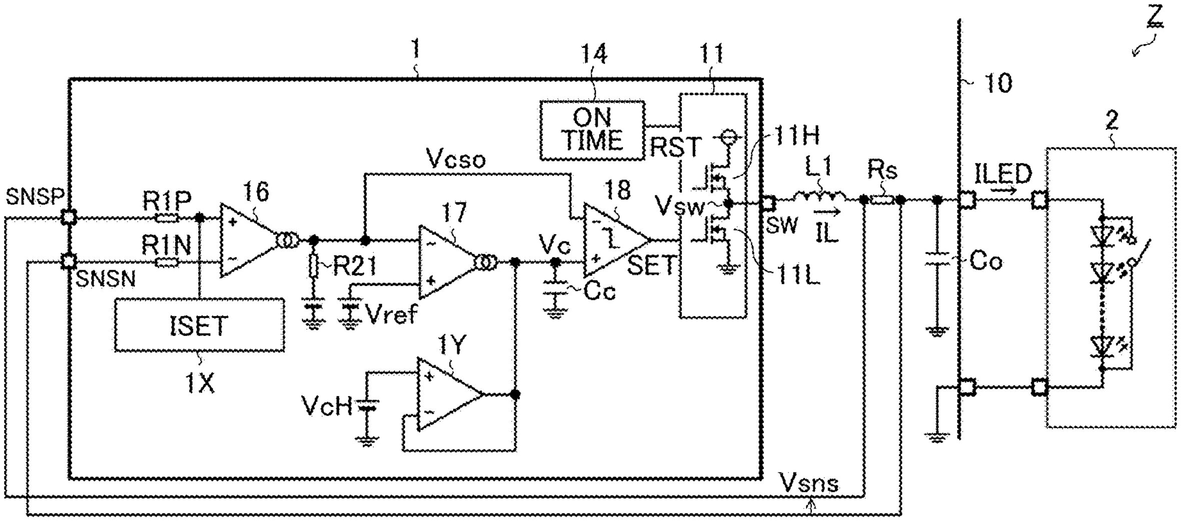
FIG. 11 is a diagram illustrating an LED lamp module of a second embodiment.

FIG. 11 is a diagram illustrating the LED lamp module Z of a second embodiment. The LED lamp module Z of the present embodiment is based on the first embodiment described previously (FIG. 4 and FIG. 5), with modification to the internal configuration (in particular, the output feedback system) of the LED driver IC 1. Thus, in the present figure, the components already described above are denoted by the same symbol s as in FIG. 4 and overlapping descriptions thereof are omitted, and the following description will focus on new components and modifications.

As illustrated in the previously referenced FIG. 5 as well, the current sense amplifier 16 generates a current detection signal Vcso (=equivalent to the current detection signal VISET in FIG. 5) corresponding to a difference between the sense voltage Vsns corresponding to the inductor current IL (and thus the output current ILED) and a predetermined current setting signal (e.g., an offset voltage corresponding to the set current ISET). The resistor R21, which is connected to the output end of the current sense amplifier 16, is connected between the output end of the current sense amplifier 16 and an application end of a reference voltage Vref.

Further, in the LED driver IC 1 of the present embodiment, the previously-described slope signal generator 15 is removed, and the current detection signal Vcso is output from the output end of the current sense amplifier 16 to the respective inverting input ends (−) of the error amplifier 17 and the comparator 18.

The error amplifier 17 outputs the error signal Vc corresponding to a difference between the current detection signal Vcso fed to the inverting input end (−) thereof and the reference voltage Vref fed to the non-inverting input end (+) thereof. In other words, the error amplifier 17 generates the error signal Vc such that a direct-current component of the current detection signal Vcso has a zero value.

The comparator 18 compares the current detection signal Vcso fed to the inverting input end (−) thereof with the error signal Vc fed to the non-inverting input end (+) thereof, and thereby generates the set signal SET. The set signal SET is at low level when Vc<Vcso, and is at high level when Vc>Vsco. Accordingly, the lower the error signal Vc is, the later the timing is at which the set signal SET rises (thus the timing at which the high-side switch 11H turns on), and the higher the error signal Vc is, the earlier the timing is at which the set signal SET rises.

The driver 11 turns on the high-side switch 11H and turns off the low-side switch 11L at a rising timing of the set signal SET, and also turns off the high-side switch 11H and turns on the low-side switch 11L at a rising timing of the reset signal RST.

That is, the driver 11 turns on the high-side switch 11H and turns off the low-side switch 11L when the current detection signal Vcso falls to the error signal Vc, and also turns off the high-side switch 11H and turns on the low-side switch 11L when the predetermined on-time Ton passes after the high-side switch 11H is turned on.

In this manner, the driver 11 complementarily turns on/off the high-side switch 11H and the low-side switch 11L in accordance with the set signal SET and the reset signal RST, and thereby performs the feedback control of the inductor current IL (and thus the output current ILED) using the bottom detection fixed on-time method such that the output current ILED becomes equal to the predetermined current setting value (target value).

The LED driver IC 1 of the present embodiment further includes a clamper 1Y that limits the error signal Vc to the predetermined upper limit value VcH or lower. As the clamper 1Y, there may be used an operational amplifier that has the upper limit value VcH of the error signal Vc applied to a non-inverting input end (+) thereof, and of which an inverting input end (−) and an output end are connected to an application end of the error signal Vc.

Figure 12:
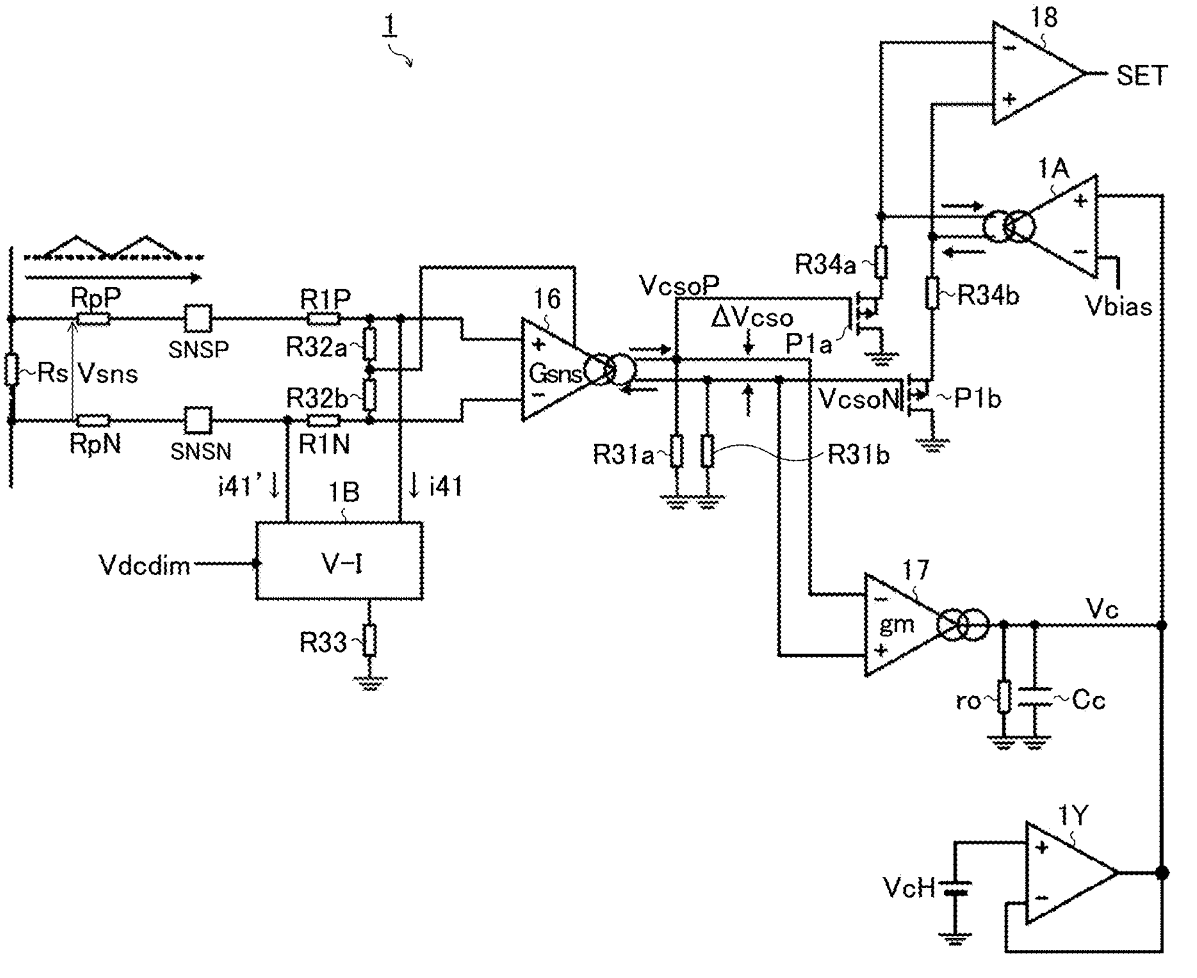
FIG. 12 is a diagram illustrating an example of a circuit configuration in the second embodiment.

FIG. 12 is a diagram illustrating an example of a specific circuit configuration of the LED driver IC 1 in the second embodiment. In the present figure, the components already described above are denoted by the same symbols as in FIG. 11 and overlapping descriptions thereof are omitted, and the following description will focus on new components and modifications.

The LED driver IC 1 of the present configuration example includes, integrated therein, in addition to the current sense amplifier 16, the error amplifier 17, the comparator 18, the input resistors RIP and R1N, and the capacitor Cc, of which all have been described above, a bias amplifier 1A, a V-I converter 1B, transistors P1*a* and P1*b* (e.g., a PMOSFET (P-channel type MOSFET)), and resistors R31*a*, R31*b*, R32*a*, R32*b*, R33, R34*a*, R34*b*, and Ro.

Further, in the LED driver IC 1 of the present configuration example, the current limiting resistors RpP and RpN are respectively connected between the first end (high-potential end) of the sense resistor Rs and the SNSP pin and between the second end (low-potential end) of the sense resistor Rs and the SNSN pin. This feature is similar to what is illustrated in the previously referenced FIG. 5.

The V-I converter 1B is a functional block that converts a voltage signal (=the analog light dimming signal Vdcdim) into a current signal (=a first reference current i41 and a second reference current i41').

As illustrated in the present figure, in the LED driver IC 1 of the present embodiment, in order to generate a reference voltage of the current sense amplifier 16 (=an analog light dimming signal Vdcdim×R1P/R33 subjected to scaling), it is necessary to pass the first reference current i41 through the V-I converter 1B. For this purpose, the LED driver IC 1 of the present embodiment includes a first reference current path that is configured to pass the first reference current i41 between the SNSP pin and a first output end of the V-I converter 1B.

Note that in the configuration where the first reference current i41 flows only through the current limiting resistor RpP externally connected to the SNSP pin, the reference voltage of the current sense amplifier 16 deviates by a magnitude of voltage appearing across the current limiting resistor RpP. To address this, the LED driver IC 1 of the present embodiment includes a second reference current path configured to pass the second reference current i41' between the SNSN pin and a second output end of the V-I converter 1B. The first reference current i41 and the second reference current i41' may equal in value, or a given offset may be applied between them.

According to this configuration, where the first reference current i41, which is necessary to generate the reference voltage of the current sense amplifier 16, is corrected using the second reference current i41', even with the current limiting resistors RpP and RpN being externally connected respectively to the SNSP pin and the SNSN pin, a gain of the V-I converter 1B (and thus the reference voltage of the current sense amplifier 16) is uniquely determined in accordance with a ratio between the input resistor R1P and the resistor R33, and thus it is possible to alleviate reduction in current detection accuracy (in particular, temperature drift) in the LED driver IC 1.

The current sense amplifier 16 amplifies the sense voltage Vsns and thereby generates a differential current detection signal ΔVcso (=VcsoP−VcsoN). The non-inverting input end (+) of the current sense amplifier 16 is connected via the input resistor R1P to the SNSP pin. The inverting input end (−) of the current sense amplifier 16 is connected via the input resistor R1N to the SNSN pin. A first differential output end of the current sense amplifier 16 is connected to a first end of the resistor R31*a* and is also connected to the inverting input end (−) of the error amplifier 17. A second differential output end of the current sense amplifier 16 is connected to a first end of the resistor R31*b* and is also connected to the non-inverting input end (+) of the error amplifier 17. Respective second ends of the resistors R31*a* and R31*b* are both connected to the ground end. Further, between the non-inverting input end (+) and the inverting input end (−) of the current sense amplifier 16, the resistors R32*a* and R32*b* are connected in series, and from a connection node between them, a driving voltage is supplied to the current sense amplifier 16.

The error amplifier 17 outputs a current corresponding to the current detection signal ΔVcso differentially fed between the non-inverting input end (+) and the inverting input end (−) thereof, and generates the error signal Vc by charging/discharging the capacitor Cc. Between the output end of the error amplifier 17 and the ground end, the resistor ro is connected in parallel with the capacitor Cc. The capacitor Cc is provided for phase compensation. Further, the resistor ro is the output impedance of the error amplifier 17, and does not exist as a real element.

A gate of the transistor P1*a* is connected to the first differential output end of the current sense amplifier 16. A drain of the transistor P1*a* is connected to the ground end. A source of the transistor P1*a* is connected to a first end of the resistor R34*a*. A second end of the resistor R34*a* is connected to the inverting input end (−) of the comparator 18. Connected in this manner, the transistor P1*a* functions as a first voltage follower (first source follower) connected between the first differential output end of the current sense amplifier 16 and the inverting input end (−) of the comparator 18.

A gate of the transistor P1*b* is connected to the second differential output end of the current sense amplifier 16. A drain of the transistor P1*b* is connected to the ground end. A source of the transistor P1*b* is connected to a first end of the resistor R34*b*. A second end of the resistor R34*b* is connected to the non-inverting input end (+) of the comparator 18. Connected in this manner, the transistor P1*b* functions as a second voltage follower (second source follower) connected between the second differential output end of the current sense amplifier 16 and the non-inverting input end (+) of the comparator 18.

The bias amplifier 1A, in accordance with a difference between the error signal Vc fed to a non-inverting input end (+) thereof and a bias voltage Vbias fed to an inverting input end (−) thereof, outputs a differential current to each of the resistors R34*a* and R34*b*, and thereby determines respective operating points of the first voltage follower and the second voltage follower.

With reference to the present figure, to the inverting input end (−) of the comparator 18, there is fed a subtraction signal (=VcsoP+Vgs(P1*a*)−(Vc−Vbias)) obtained by subtracting the error signal Vc from an output signal of the first voltage follower (=VcsoP+Vgs (P1*a*)).

On the other hand, to the non-inverting input end (+) of the comparator 18, there is fed an addition signal (=VcsoN+Vgs(P1*b*)+(Vc−Vbias)) obtained by adding the error signal Vc to an output signal of the second voltage follower (=VcsoN+Vgs(P1*b*)).

Thus, in the comparator 18, when (VcsoP−Vc)−(VcsoN+Vc)>0, that is, when ΔVcso−2Vc>0, a logic level of the set signal SET is switched. To supplement the above description, the bottom value of the inductor current IL is detected when current information ΔVcso reaches the control voltage Vc.

In the configuration where a difference between the inductor current IL and its target value is sensed, the differential input difference of the current sense amplifier 16 becomes 0 (a DC error becomes 0), and thus no current difference is generated between the SNSP pin and the SNSN pin. As a result, there is no need to supply power from the PIN pin to the current sense amplifier 16, and thus a Δ zero bias current can be achieved. Further, it is also possible to integrate the slope signal generator 15 into the current sense amplifier 16 for a compact circuit scale.

Figure 13:
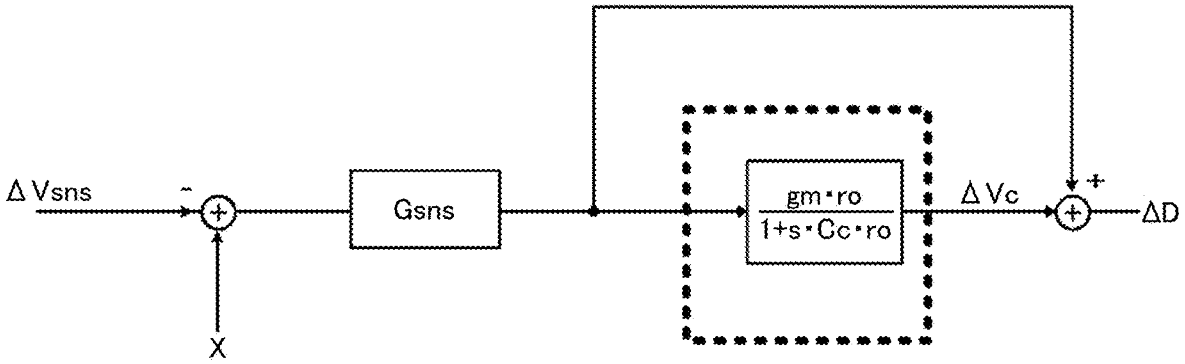
FIG. 13 is a diagram illustrating an example of signal transmission in the second embodiment.

FIG. 13 is a diagram illustrating an example of signal transmission in the LED driver IC 1 of the second embodiment (=a revision of the previously referenced FIG. 12 as a block diagram). Symbol Gsns denotes a gain of the current sense amplifier 16. Symbol gm denotes a transconductance of the error amplifier 17 (=a conversion value from an amplifier input voltage to an amplifier output current). Symbol ΔVsns denotes the sense voltage Vsns. Symbol X denotes a current setting value (target value) of the output current ILED. Symbol ΔVc denotes the error signal Vc. Symbol ΔD denotes an off-duty ratio of the low-side switch 11L (control of a bottom value of the inductor current IL→control of an off period of the inductor current IL). Symbol ro denotes a resistance value of the resistor ro (=an output impedance of the error amplifier 17). Symbol Cc denotes a capacitance value of the capacitor Cc. Symbol s denotes a complex number s (=jω).

As is clear from the present figure, the LED driver IC 1 of the first embodiment has a signal transmission system where only the current ripple component ΔIL of the inductor current IL is a control point. Further, in the signal transmission system of the present figure, a high-speed path can be generated with respect to a current error component (=a value of a difference between the output current ILED and the current setting value).

Figure 14:
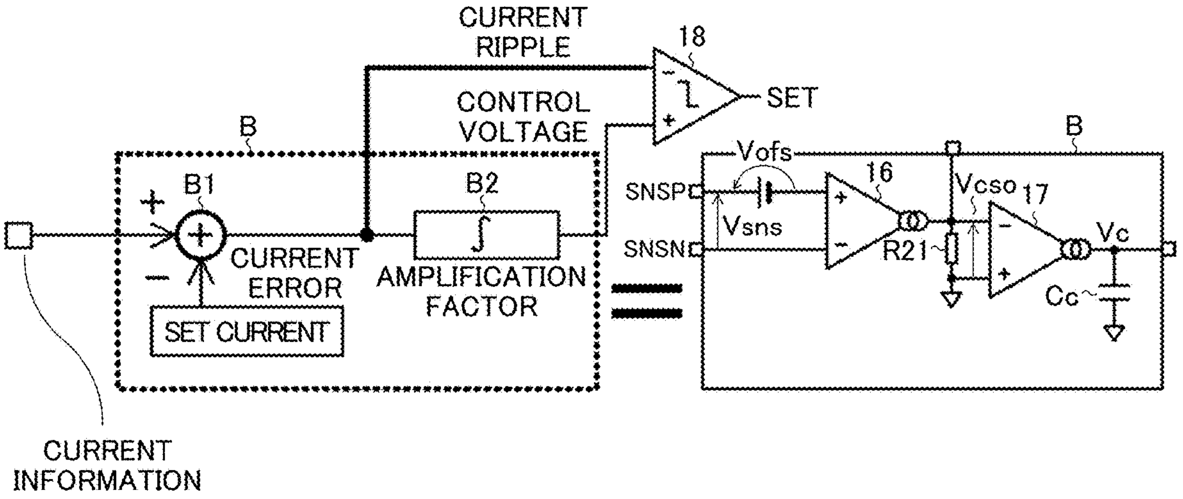
FIG. 14 is a diagram illustrating an example of a control block in the second embodiment.

FIG. 14 is a diagram illustrating an example of a control block in the LED driver IC 1 of the second embodiment. A control block B of the present figure is a function-based revision of the current sense amplifier 16 and the error amplifier 17 of FIG. 12, and includes a subtractor B1 and an amplifier B2.

The subtractor B1 subtracts the set current ISET from the current information of the inductor current IL (=the average inductor current IL_ave+the current ripple component ΔIL), and thereby generates a current error signal. When the output current ILED is in an equilibrium state, the average inductor current IL_ave is equal to the set current ISET. Thus, the current error signal output from the subtractor A1 is equivalent to the current ripple component ΔIL of the inductor current TL.

The amplifier B2 amplifies the current error signal (=the current ripple component ΔIL) output from the subtractor B1 by integration and thereby generates the control voltage.

So far, there is no difference from the first embodiment (FIG. 7). Note that, however, the comparator 18 compares the current ripple component ΔIL of the inductor current IL with the control voltage (=the error signal Vc).

Figure 15:
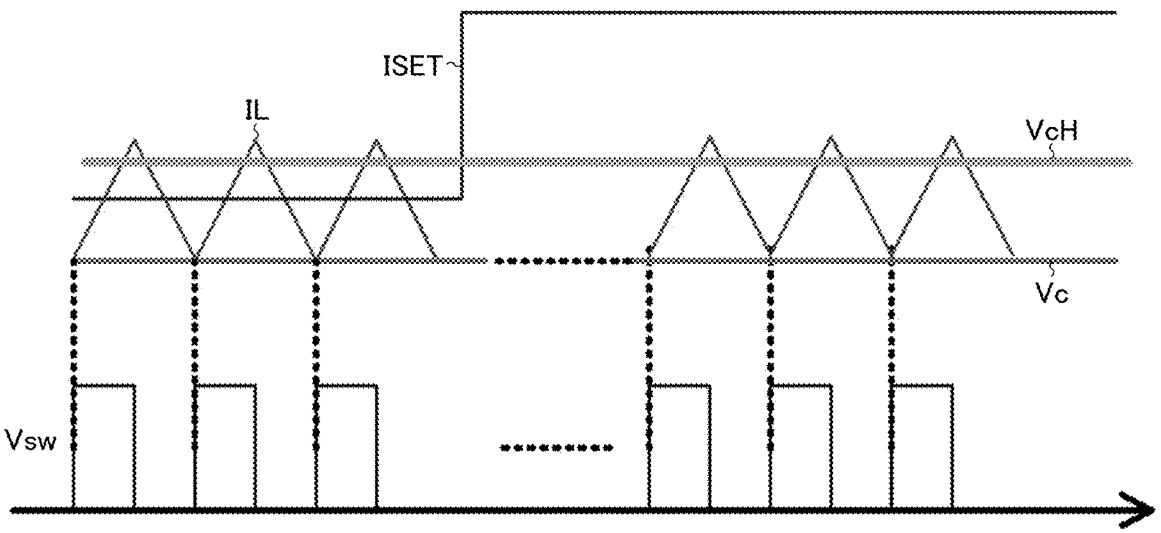
FIG. 15 is a diagram illustrating how an error signal does not depend on a set current in the second embodiment.

FIG. 15 is a diagram illustrating how the error signal Vc in the LED driver IC 1 of the second embodiment does not depend on the set current ISET.

In the LED driver IC 1 of the second embodiment, focusing on the fact that a DC component of the current error signal (=the current detection signal Vcso) becomes 0 due to feedback control, that is, the current detection signal Vcso varies based on a fixed operating point, control is performed by comparison between the bottom value of the current detection signal Vcso and the error signal Vc.

Thus, even when the set current ISET is raised, the error signal Vc does not rise following the set current ISET. That is, in the LED driver IC 1 of the second embodiment, the error signal Vc does not have dependence on the set current ISET. As a result, it becomes possible to set the upper limit value VcH (=the upper limit clamp value in the event of an LED open fault) of the error signal Vc to a value lower than in the first embodiment (=a value in the vicinity of the normal operating point).

Figure 16:
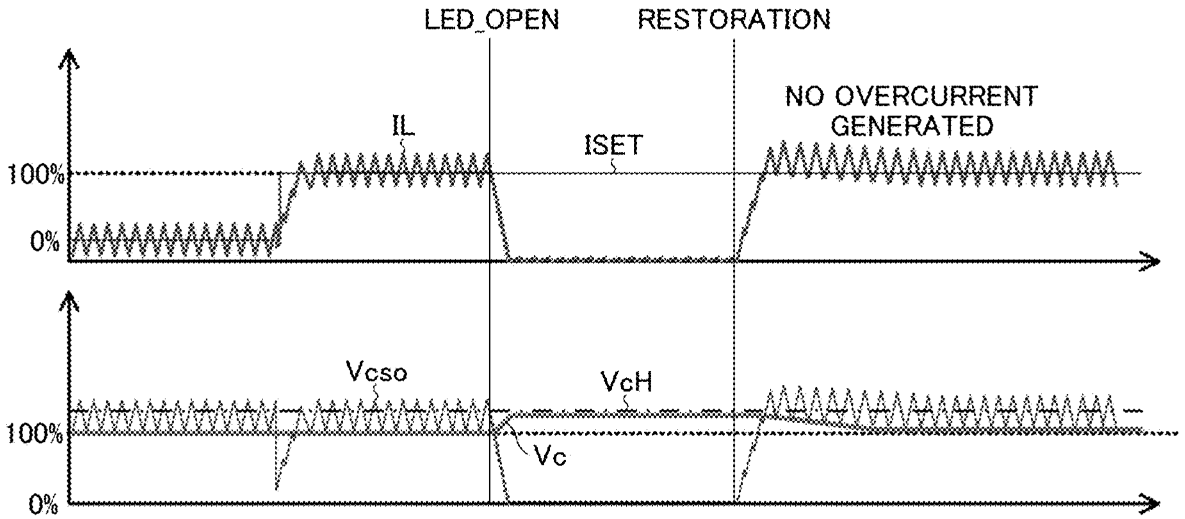
FIG. 16 is a diagram illustrating an example of a lighting restoration operation in the second embodiment.

FIG. 16 is a diagram illustrating an example of the lighting restoration operation in the LED driver IC 1 of the second embodiment. The upper diagram of the present figure illustrates a behavior of the inductor current IL. The lower diagram of the present figure illustrates behaviors of the current detection signal Vcso and the error signal Vc.

If an open fault occurs in the LED string 2, the inductor current IL stops flowing, and thus a state is brought about where the sense voltage Vsns is not generated (a state where the output feedback control is rendered ineffective). If the LED driver IC 1 is continuously operated in this state, the current detection signal Vcso falls to low level (GND level), and the error signal Vc rises to the upper limit value VcH.

Thereafter, when the open fault point in the LED string 2 is bypassed by the previously-described matrix manager 3 (FIG. 1), for example, the inductor current IL starts to flow again, and the LED string 2 is restored to its lit state.

Note that, when lighting is restored from the LED open fault, the error signal Vc still stays at the upper limit value VcH. In the LED driver IC 1 of the second embodiment, however, the upper limit value VcH (=the upper limit clamp value in the event of an LED open fault) of the error signal Vc can be set to a value (=an approximate value of the normal operating point) lower than in the first embodiment. This allows the error signal Vc to quickly return to the normal operating point, and thus makes it possible to significantly reduce occurrences of an excessive inductor current IL (so-called overcurrent).

Consequently, there is no need to shut down the LED driver IC 1 to prevent overcurrent, and thus it is possible to perform a high-speed and safe lighting restoration operation from an LED open fault.

Figure 17:
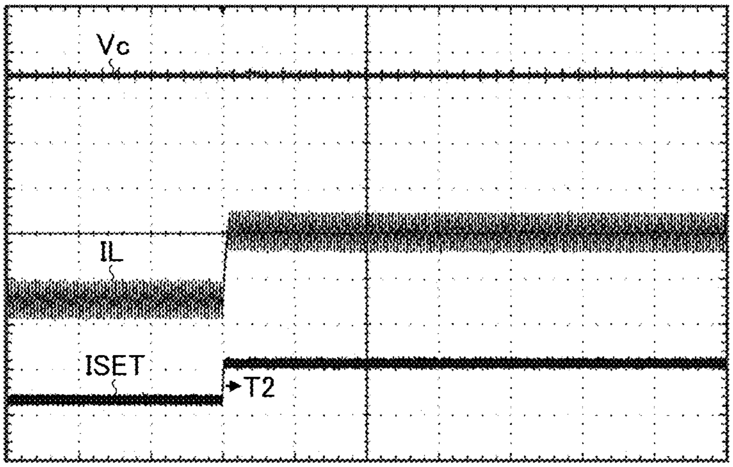
FIG. 17 is a diagram illustrating an example of response of an output current in the second embodiment.

FIG. 17 is a diagram illustrating response of the output current ILED in the LED driver IC 1 of the second embodiment, where the error signal Vc, the inductor current IL, and the set current ISET are depicted in order from the top.

As described previously, in the LED driver IC 1 of the second embodiment, the error signal Vc does not have dependency on the set current ISET. Thus, even when the set current ISET is raised, it causes no change of the error signal Vc, and the inductor current IL converges to the target value without delay. As for a time T2 taken for the inductor current IL to converge to the target value, it is only about several s.

In this manner, with the LED driver IC 1 of the second embodiment, it is possible not only to perform high-speed and safe lighting restoration operation in the event of an LED open fault, but also to significantly improve the response of the inductor current IL (and thus the output current ILED) with respect to the set current ISET.

<Overview>

What follows is an overview of the various embodiments disclosed above.

For example, a light-emitting element drive device disclosed herein is configured to include a current sense amplifier configured to generate a current detection signal corresponding to a difference between a sense voltage corresponding to an output current supplied to a light-emitting element and a predetermined current setting signal, an error amplifier configured to generate an error signal such that a direct-current component of the current detection signal has a zero value, a comparator configured to generate a set signal by comparing the current detection signal with the error signal, and a driver configured to perform feedback control of the output current in accordance with the set signal (a first configuration).

The light-emitting element drive device according to the above-described first configuration may be configured to further include a clamper configured to limit the error signal to an upper limit value or lower (a second configuration).

In the light-emitting element drive device according to the above-described first or second configuration, a first differential output end and a second differential output end of the current sense amplifier may be configured to be respectively connected to an inverting input end and a non-inverting input end of the error amplifier (a third configuration).

The light-emitting element drive device according to the above-described third configuration may be configured to further include a first voltage follower configured to be connected between the first differential output end of the current sense amplifier and an inverting input end of the comparator, and a second voltage follower configured to be connected between the second differential output end of the current sense amplifier and a non-inverting input end of the comparator, and the error signal may be configured to be subtracted from an output signal of the first voltage follower and added to an output signal of the second voltage follower (a fourth configuration).

In the light-emitting element drive device according to any on one of the above-described first to fourth configurations, the driver may be configured to be of a half-bridge type including a high-side switch and a low-side switch (a fifth configuration).

In the light-emitting element drive device according to the above-described fifth configuration, the driver may be configured to turn on the high-side switch and turn off the low-side switch when the current detection signal falls to the error signal, and the driver may be configured to turn off the high-side switch and turn on the low-side switch when a predetermined on-time passes after the high-side switch is turned on (a sixth configuration).

The light-emitting element drive device according to the above-described sixth configuration may be configured to further include an on-time setting unit configured to generate a pulse in a reset signal when the on-time passes after a pulse is generated in the set signal, and the driver may be configured to perform the feedback control of the output current using a bottom detection fixed on-time method in accordance with the set signal and the reset signal (a seventh configuration).

Further, for example, a light emission control device disclosed herein is configured to include the light-emitting element drive device according to any one of the above-described first to seventh configurations, an inductor and a capacitor configured to form a switch output stage together with a switch element included in the driver, and a sense resistor configured to convert an inductor current flowing through the inductor into the sense voltage (an eighth configuration).

Further, for example, a light emission device disclosed herein is configured to include the light emission control device according to the above-described eighth configuration, and a light-emitting element configured to be supplied with the output current from the light emission control device (a ninth configuration).

The light emission device according to the above-described ninth configuration may be configured to further include a switch control device configured to switch the number of serial stages of the light-emitting element as necessary (a tenth configuration).

According to the disclosure herein, it becomes possible to provide a light-emitting element drive device capable of performing a high-speed and safe lighting restoration operation when a load is open, and a light emission control device and a light emission device that use the light-emitting element drive device.

Further Modifications

The various technical features disclosed herein may be implemented in any other manners than in the embodiments described above, and allow for any modifications made without departure from their technical ingenuity. That is, it should be understood that the above embodiments are illustrative in all respects and are not intended to limit the present invention, that the technological scope of the present invention is indicated by the claims, and that all modifications within the scope of the claims and the meaning equivalent to the claims are covered.

The invention claimed is:

1. A light-emitting element drive device, comprising:
 a current sense amplifier configured to generate a current detection signal corresponding to a difference between a sense voltage corresponding to an output current supplied to a light-emitting element and a predetermined current setting signal;
 an error amplifier configured to generate an error signal such that a direct-current component of the current detection signal has a zero value;
 a comparator configured to generate a set signal by comparing the current detection signal with the error signal; and
 a driver configured to perform feedback control of the output current in accordance with the set signal.

2. The light-emitting element drive device according to claim 1, further comprising:
 a clamper configured to limit the error signal to an upper limit value or lower.

3. The light-emitting element drive device according to claim 1,
 wherein
 a first differential output end and a second differential output end of the current sense amplifier are respectively connected to an inverting input end and a non-inverting input end of the error amplifier.

4. The light-emitting element drive device according to claim 3, further comprising:

a first voltage follower configured to be connected between the first differential output end of the current sense amplifier and an inverting input end of the comparator; and a second voltage follower configured to be connected between the second differential output end of the current sense amplifier and a non-inverting input end of the comparator, wherein the error signal is subtracted from an output signal of the first voltage follower and is added to an output signal of the second voltage follower.

5. The light-emitting element drive device according to claim 1, wherein the driver is of a half-bridge type including a high-side switch and a low-side switch.

6. The light-emitting element drive device according to claim 5, wherein the driver turns on the high-side switch and turns off the low-side switch when the current detection signal falls to the error signal, and the driver turns off the high-side switch and turns on the low-side switch when a predetermined on-time passes after the high-side switch is turned on.

7. The light-emitting element drive device according to claim 6, further comprising:

an on-time setting unit configured to generate a pulse in a reset signal when the on-time passes after a pulse is generated in the set signal, wherein the driver performs the feedback control of the output current using a bottom detection fixed on-time method in accordance with the set signal and the reset signal.

8. A light emission control device, comprising:

the light-emitting element drive device according to claim 1;

an inductor and a capacitor configured to together form a switch output stage together with a switch element included in the driver; and a sense resistor configured to convert an inductor current flowing through the inductor into the sense voltage.

9. A light emission device, comprising:

the light emission control device according to claim 8; and a light-emitting element configured to be supplied with the output current from the light emission control device.

10. The light emission device according to claim 9, further comprising:

a switch control device configured to switch the number of serial stages of the light-emitting element as necessary.

* * * * *